3,370,029
FLAME-RETARDANT COMPOSITIONS
FOR PLASTICS
Joseph Frederick Cannelongo, Piscataway, N.J., assignor to American Cyanamid Company, Stamford, Conn., a corporation of Maine
No Drawing. Filed Mar. 14, 1966, Ser. No. 533,796
10 Claims. (Cl. 260—28.5)

This invention relates to flame-retardant compositions. More particularly, this invention relates to flame-retardant compositions comprising a combination of a phosphonic acid and a chlorinated hydrocarbon material. Still more particularly, this invention relates to flame-retarded compositions comprising a thermoplastic polymer containing a flame-retarding amount of a synergistic combination of a chlorinated hydrocarbon material and a compound having the formula (I)

wherein R represents an aryl ($C_6$–$C_{10}$), alkyl ($C_1$–$C_8$), aralkyl ($C_7$–$C_{11}$), carboxyalkyl or haloalkyl ($C_1$–$C_4$) radical.

The use of certain additives for the purpose of reducing the flammability of various thermoplastic polymers is well known to those skilled in the art. Among the additives currently employed for such a use are various specific types of phosphorus containing compounds. These phosphorus compounds are generally used either alone or in combination with other materials such as aliphatic or aromatic antimonous compounds. Certain analogous materials such as chlorostyrene copolymers, chlorinated paraffin waxes, alone or with antimony oxide, are also known to be effective flame-retardants for resinous materials. One drawback of these known compounds and combinations of compounds, however, has been the fact that generally large amounts, i.e. upwards of 35%, of the additive must be incorporated into the polymer in order to render it reasonably flame-retardant. Such large quantities of additive ofttimes deleteriously alter the properties of the polymer and moreover, some additives tend to crystallize or oil out of the polymer after a relatively short time of incorporation therein.

I have now found that superior flame-retarding properties can be imparted to thermoplastic polymers by incorporating into the polymer a synergistic combination or mixture of a chlorinated hydrocarbon material and a compound represented by Formula I, above. The novel synergistic combination provides improved flame-retardance over the additives of the prior art and, additionally, provides this superior result at materially lower concentrations than previously found to be necessary for the known additives.

The results shown by the use of the above-mentioned flame-retardant combination are surprising and unexpected in that the combination provides a greater degree of flame-retardancy than one would expect from the results shown by the use of the components individually, i.e. they are synergistic. Moreover, the combination produces a greater degree of flame-retardancy at lower concentrations in the polymer in the absence of any third ingredient, such as antimony compounds, which were previously believed to be necessary. This synergism, moreover, does not appear to be limited to specific combinations, but is broadly applicable to any combination of a chlorinated hydrocarbon material and a phosphonic acid represented by Formula I.

It is therefore an object of the present invention to provide flame-retardant compositions.

It is a further object of the present invention to provide flame-retardant compositions comprising a combination of a phosphonic acid and a chlorinated hydrocarbon material.

It is still a further object of the present invention to provide flame-retarded compositions comprising a thermoplastic polymer containing a flame-retarding amount of a synergistic combination of a chlorinated hydrocarbon material and a phosphonic acid represented by Formula I, above.

These and other objects of the instant invention will become more apparent to those skilled in the art upon reading the more detailed description set forth hereinbelow.

As mentioned above, the first critical component of my novel flame-retardant compositions is a chlorinated hydrocarbon material. Although any chlorinated hydrocarbon material tends, to some extent, to be effective, I have found that those which are stable to the processing conditions of thermoplastic polymers when in combination therewith are more preferable. That is to say, a critical limitation in regard to the chlorinated hydrocarbon materials is that they should have a boiling point of at least about 200° C., in that those of a lower boiling point tend to vaporize out of the polymer when the polymer is ultimately processed or fabricated for consumer production.

A further critical limitation in regard to the chlorinated hydrocarbon materials utilized herein is that they must contain at least about 40% of combined chlorine, preferably from about 40% to 80%, by weight, based on the weight of the compound per se. Percentages of combined chlorine above 80% are tolerable but impractical, while at percentages lower than about 40%, the effectiveness of the combination is materially lowered. The chlorinated hydrocarbon materials may be used in concentrations ranging from about 0.2% to about 15.0%, by weight, based on the weight of the polymer to which they are added, preferably from about 0.5% to about 12.0%, same basis.

Examples of useful chlorinated hydrocarbon materials include compounds such as perchloropentacyclodecane, hexachlorocyclopentadiene, hexachlorobenzene; the polychlorinated monocyclic aromatic hydrocarbons such as 2,3,5,6-tetrachloro-o,m or p-xylene, 2,5-dichloro - o,m or p-xylene, α,α-dichloro-o-,m or p-xylene, α,α'-hexachloro-o,m or p-xylene; various commercial available chlorinated biphenyls and polyphenyls which range in consistency from oily liquids to fine, white crystals to hard, transparent resins. These biphenyls and polyphenyls are non-oxidizing, have a low volatility and are non-corrosive. They are not hydrolyzed by water, alkalies or acids, are insoluble in water, glycerine and glycols and distill at 215° C. to 450° C. The crystalline materials have melting points up to 290° C. and the resins have softening points up to 105° C.

A further class of applicable chlorinated hydrocarbon materials useful herein are the chlorinated paraffin waxes containing between about 40% to 80% combined chlorine and averaging from 18–36 carbon atoms. These materials are chlorinated soft or slack waxes and are set forth in one or more of the following U.S. Patents Nos. 2,924,532, 2,962,646 and 3,194,846, which patents are hereby incorporated herein by reference.

The second critical component of my novel flame-retardant compositions is a phosphonic acid represented by Formula I, above. These acids are suitable herein as long as they too are stable to the ultimate processing conditions of the polymer into which they are incorporated. They may be produced by any known procedure, some of which are disclosed in U.S. Patents Nos. 2,678,940, 2,717,906, 2,874,184 and 3,032,500, each of which is hereby incorporated herein by reference.

The phosphonic acids may be incorporated into the polymeric material in concentrations ranging from about 0.1% to about 15.0%, preferably, 0.2%–12.0%, by weight, based on the weight of the polymer to which they are added.

The terms "aryl radical" and "aralkyl radical," as used herein in regard to substituent R of Formula I, above, are meant to include not only carbon-hydrogen cyclic compounds but also lower alkyl, halogen, nitro and cyano ring-substituted cyclic compounds and the scope of the instant invention should be construed as to include compounds falling within this definition.

Examples of phosphonic acids which may be used according to the instant invention include phenylphosphonic acid, tolylphosphonic acid, xylylphosphnic acid, 1-naphthylphosphonic acid, benzylphosphonic acid, p-tolylmethylphosphonic acid, 2-phenethylphosphonic acid, 1-phenethylphosphnic acid, 1 - phenylpropylphosphonic acid, 2 - phenylpropylphosphonic acid, 3 - phenylpropylphosphonic acid, 1-phenylbutylphosphonic acid, 2-phenylbutylphosphonic acid, 3-phenylbutylphosphonic acid, 4-phenylbutylphosphonic acid, 1-tolylethylphosphonic acid, 1-tolylpropylphosphonic acid, 2 - tolylpropylphosphonic acid, 3-tolylpropylphosphonic acid, p - ethylbenzylphosphonic acid, p - butylbenzylphosphonic acid, m - propylbenzylphosphonic acid, p-ethylbenzylphosphonic acid, 2-(p-methylphenethyl)-phosphonic acid, 2-xylylethylphosphonic acid, naphthyl-1-methylphosphonic acid, o-, m-, or p - chlorophenylphosphonic acid, o-, m-, or p-nitrophenylphosphonic acid, o-, m-, or p - butylphenylphosphonic acid, 3-methylnaphthyl-1-methylphosphonic acid, 2-cyano-1-naphthylphosphonic acid, 3-butyl-1-naphthylphosphonic acid, 2,4 - dichlorobenzylphosphonic acid, p-chlorobenzylphosphonic acid, 2-p - chlorophenethylphosphonic acid, p - butylbenzylphosphonic acid, m - propyl-4 - (m-iodophenyl)butylphosphonic acid, 3 - (p - fluorophenyl)butylphosphonic acid, 2 - (2,4 - dichlorobenzyl) ethylphosphonic acid, 3 - (2,5 - dibromophenyl)propylphosphonic acid, o-, m-, and p-nitrophenylphosphonic acid, 3-nitro-1-naphthylphosphonic acid, carboxymethylphosphonic acid, (2 - carboxyethyl)phosphonic acid, (3-carboxypropyl)phosphonic acid, (4 - carboxybutyl)phosphonic acid, (2-carboxypropyl)phosphonic acid, (1-carboxyethyl)phosphonic acid, (1-carboxybutyl)phosphonic acid, chloromethylphosphonic acid, 2 - chloroethyl)phosphonic acid, (3-chloropropyl)phosphonic acid, (4-chlorobutyl)phosphonic acid, (3-bromobutyl)phosphonic acid, (2-iodopropyl)phosphonic acid, (2-fluorobutyl)phosphonic acid, (1-bromomethyl)phosphonic acid, (dichloromethyl)phosphonic acid, (1,2-dichloroethyl)phosphonic acid, (2,3 - dibromopropyl)phosphinic acid, (1,4 - diodobutyl) phosphonic acid, (2,4 - difluorobutyl)phosphonic acid, (1,2,3 - trichloroethyl)phosphonic acid, (trichloromethyl)phosphonic acid, 1-(o-ethylphenyl)propylphosphonic acid, 2-(m-propylphenyl)butylphosphonic acid, p - ethylbenzylphosphonic acid, methylphosphonic acid, ethylphosphonic acid, n - propylphosphonic acid, isopropylphosphonic acid, n-butylphosphonic acid, isobutylphosphonic acid, t-butylphosphonic acid, amylphosphonic acid, n-hexylphosphonic acid, cyclohexylphosphonic acid, heptylphosphonic acid, octylphosphonic acid and the like.

In general, any thermoplastic polymeric material may be rendered flame-retardant by the incorporation therewith of the above-identified flame-retardant combinations. Generally, however, the vinyl type polymers, wherein a monomeric material is polymerized, by known methods, e.g. by the use of free-radical generating catalysts, irradiation, anionic and cationic catalysts, etc. are those preferred. Examples of the vinyl type polymers which may be used to form my novel compositions are the polyvinyl acetates, polyvinylbutyral, butadiene copolymers, e.g. acrylonitrile-butadiene-styrene copolymers, the polyacrylonitriles, polybutadiene, polyaldehydes such as polyoxymethylene, and the like. Additionally and even more preferably, one may incorporate the flame-retardant synergistic combinations mentioned above into such polymers as the styrene polymers, i.e. polystyrene, α-methyl styrene polymers etc. the α-olefin polymers, such as the homopolymers and copolymers etc. containing, as the major constituent, thereof, ethylene, propylene, including polyethylene, polypropylene and the like and the acrylate and methacrylate homopolymers and copolymers produced from monomers having the formula (II) 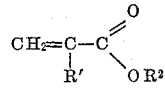

wherein R′ is hydrogen or a methyl radical and R₂ is hydrogen or an alkyl radical having from 1 to 6 carbon atoms, inclusive. Examples of monomers represented by Formula II include methyl acrylate, ethyl acrylate, n-propyl acrylate, isopropyl acrylate, n-butyl acrylate, t-butyl acrylate, isobutyl acrylate, n-amyl acrylate, t-amyl acrylate, hexyl acrylate and their corresponding alkyl methacrylates, etc.

Also such polymers as the nylons, e.g. adipic acid-hexamethylenediamine reaction products; the cellulosics such as cellulose acetate (and/or butyrate, etc.), cellulose nitrate; the polycarbonates, i.e. phosgene-Bisphenol A reaction products; the so-called impact polymers, i.e. rubber-polymer blends such as blends of polystyrene with 5–10% of butadiene-styrene, etc. and the like may be made flame-retardant by the incorporation therein of the phosphonic acid-chlorinated hydrocarbon synergistic combinations discussed hereinabove.

Examples of other monomers which may be used to form the thermoplastic vinyl polymers encompassed by the present invention, polymerized either singularly or in combination with each other or with the other compounds set forth hereinabove, are such monomers as the unsaturated ethers, e.g., ethyl vinyl ether, diallyl ether, etc. the unsaturated amides, for instance, N-allyl caprolactam, acrylamide, and N-substituted acrylamides, e.g., N-methylol acrylamide, N-allyl acrylamide, N-methyl acrylamide, N-phenyl acrylamide, etc.; the unsaturated ketones, e.g., methyl vinyl ketone, methyl allyl ketone, etc.; methylene malonic esters, e.g., methylene methyl malonate, etc. and the like.

Other examples of polymers that may be employed are those of monomers set forth, for example, in U.S. Patent No. 2,510,503, issued June 6, 1950.

The production of thermoplastic resin compositions which are flame-retardant is of considerable commercial importance in that such articles as castings, moldings, foamed or laminated articles, etc. are required, or at least desired, to be resistant to fire and flame and to possess the ability to endure heat without deterioration. Typical illustrations of applications of such compositions include castings for live electrical contacts which should not be ignited by flame or sparks, structural members such as pipes, wall coverings, wall paneling, windows, etc. and such items as ash trays, waste baskets, fibers and the like.

The novel flame-retardant combinations claimed herein may be added to the various polymers, as such, or as individual components, by any known method. That is to say, the flame-retardant components may be added to the polymer, as such, or in combination by (1) milling the polymer and the components on, for example, a two-roll mill, in a Banbury mixer, etc., by (2) molding the components and the polymer simultaneously, by (3) extruding the polymer and components or by (4) merely blending all the materials together in powder or liquid form and thereafter forming the desired ultimate product. Additionally, the flame-retardant combination may be added during the production of the polymer, i.e. during the monomer polymerization, provided, however, that the catalyst, etc. other conditions and other ingredients of the polymerization system are inert thereto.

It is also within the scope of the instant invention to incorporate such ingredients as plasticizers, dyes, pigments, heat and light stabilizers, antioxidants, antistatic agents, photochromic materials and the like into the polymeric flame-retarded polymer compositions claimed herein.

The following examples are set forth for purposes of illustration only and are not to be construed as limitations on the present invention except as set forth in the appended claims. All parts and percentages are by weight unless otherwise specified.

Any appropriate flame-retardance test may be used to determine the flame-retardant properties of any specific combination of phosphonic acid and chlorinated hydrocarbon material. One test I have found to be reasonably efficient is a modified version of that test identified as ASTM-D-635-56T. The specifications for this test are: a specimen, 5" in length, 0.5" in width and 0.045" in thickness is marked at the 1" and 4" lengths and is then supported with its longitudinal axis horizontal and its transverse axis inclined at 45° to the horizontal. A Bunsen burner with a 1" blue flame is placed under the free end of the strip and is adjusted so that the flame tip is put in contact with the strip. At the end of 30 seconds, the flame is removed and the specimen is allowed to burn. If the specimen does not continue to burn after the first ignition, it is immediately recontacted with the burner for another 30 seconds. If, after the two burnings, the strip is not burned to the 4" mark, the specimen is designated as "self-extinguishing." If the specimen is not burned to the 1" mark it is designated as "non-burning." In the modified test, the specimen is 20 mils in thickness rather than the prescribed 0.045".

*Example 1*

To 100 parts of polypropylene are added 5 parts of o-chlorobenzyl phosphonic acid and 5 parts of chlorinated paraffin wax containing 70% chemically combined chlorine (empirical formula $C_{24}H_{29}Cl_{21}$). The resultant mixture is placed in a suitable blender and dry blended for 10 minutes. The blended product is then transferred to a melt-index apparatus (see ASTM-D-1238-62%) which is preheated to 250° C. Following one minute of aging, a 2.2 kg. weight is placed on the plunger and an extrudate of 6-8 inches in length is obtained. This specimen is marked and tested according to the above-enumerated flame-retardance test. The results are set forth in Table I, below.

Various other flame-retardant combinations are then incorporated into various other resins according to Example 1 and comparisons are made between the resultant compositions and control compositions. These results are also set forth in Table I, below.

TABLE I

| Ex. | Phosphonic Acid R | Percent | Chlorinated Hydrocarbon | Percent | Polymer | Flame-Test Result |
|---|---|---|---|---|---|---|
| 1 | o-Chlorobenzyl | 5 | Chlorinated paraffin wax-70% combined chlorine. | 5 | Polypropylene | Passed. |
| 2 | ----do---- | 10 | | | ----do---- | Failed. |
| 3 | | | Same as Ex. 1 | 10 | ----do---- | Do. |
| 4 | Phenyl | 1.5 | ----do---- | 1.5 | ----do---- | Passed. |
| 5 | ----do---- | 3 | | | ----do---- | Failed. |
| 6 | o-Chlorobenzyl | 5 | Perchloropentacyclodecane | 5 | ----do---- | Passed. |
| 7 | | | ----do---- | 10 | ----do---- | Failed. |
| 8 | 2,4-dichlorobenzyl | 5.0 | Chlorinated paraffin wax-70% chlorine | 5.0 | Polyethylene | Passed. |
| 9 | ----do---- | 10 | | | ----do---- | Failed. |
| 10 | | | Same as Ex. 8 | 10 | ----do---- | Do. |
| 11 | o-Chlorobenzyl | 5 | Chlorinated paraffin wax-40% combined chlorine. | 5 | Polypropylene | Passed. |
| 12 | | | Same as Ex. 11 | 10 | ----do---- | Failed. |
| 13 | Naphthyl | 5.0 | Clear polyphenyl resin distills, 280-335° C.; softens 98-105.5° C. | 5.0 | ----do---- | Passed. |
| 14 | ----do---- | 15 | | | ----do---- | Failed. |
| 15 | | | Same as Ex. 13 | 15 | ----do---- | Do. |
| 16 | p-Cyanophenyl | 5 | Hexachlorocyclopentadiene | 5 | Poly(methylmethacrylate). | Passed. |
| 17 | ----do---- | 10 | | | ----do---- | Failed. |
| 18 | | | Same as Ex. 16 | 10 | ----do---- | Do. |
| 19 | Carboxymethyl | 8 | Chlorinated paraffin wax-40% combined chlorine. | 8 | Butadiene/styrene 25/75. | Passed. |
| 20 | ----do---- | 16 | | | ----do---- | Failed. |
| 21 | | | Same as Ex. 19 | 16 | ----do---- | Do. |
| 22 | Benzyl | 5 | Yellow viscous polyphenyl oil distills, 365-390° C.; pours, 10° C.; refractive index,[2] 1.639-1.641. | 5 | Polystyrene | Passed. |
| 23 | ----do---- | 10 | | | ----do---- | Failed. |
| 24 | | | Same as Ex. 22 | 10 | ----do---- | Do. |
| 25 | Methyl | 4.5 | 2,3,5,6-tetrachloro-p-xylene | 4.5 | ----do---- | Passed. |
| 26 | ----do---- | 10 | | | ----do---- | Failed. |
| 27 | | | Same as Ex. 25 | 10 | ----do---- | Do. |
| 28 | Tolyl | 6 | Chlorinated paraffin wax-50% combined chlorine. | 6 | ----do---- | Passed. |
| 29 | ----do---- | 15 | | | ----do---- | Failed. |
| 30 | | | Same as Ex. 28 | 15 | ----do---- | Do. |
| 31 | Octyl | 7 | White polyphenyl powder distills, 435-450° C.; softens 150-170° C. | 8 | Low density polyethylene. | Passed. |
| 32 | ----do---- | 15 | | | ----do---- | Failed. |
| 33 | | | Same as Ex. 31 | 15 | ----do---- | Do. |
| 34 | p-Nitrophenyl | 5 | Perchloropentacyclodecane | 5 | Cellulose acetate | Passed. |
| 35 | ----do---- | 10 | | | ----do---- | Failed. |
| 36 | | | Same as Ex. 34 | 10 | ----do---- | Do. |
| 37 | 4-Carboxybutyl | 5.5 | Same as Ex. 24 | 5.5 | Polypropylene | Passed. |
| 38 | ----do---- | 15 | | | ----do---- | Failed. |
| 39 | | | Same as Ex. 22 | 15 | ----do---- | Do. |
| 40 | 2-methyl-1-naphthyl | 7.5 | Hexachlorobenzene | 7.5 | Polystyrene | Passed. |
| 41 | ----do---- | 15 | | | ----do---- | Failed. |
| 42 | | | Same as Ex. 40 | 15 | ----do---- | Do. |
| 43 | 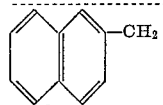 | 5 | α,α-Dichloro-m-xylene | 5 | Poly(methylmethacrylate). | Passed. |
| 44 | ----do---- | 10 | | | ----do---- | Failed. |
| 45 | | | Same as Ex. 43 | 10 | ----do---- | Do. |
| 46 | Ethyl | 5 | Same as Ex. 31 | 5 | Nylon [1] | Passed. |
| 47 | ----do---- | 10 | | | ----do---- | Failed. |
| 48 | | | Same as Ex. 31 | 10 | ----do---- | Do. |

TABLE I—Continued

| Ex. | Phosphonic Acid R | Percent | Chlorinated Hydrocarbon | Percent | Polymer | Flame-Test Result |
|---|---|---|---|---|---|---|
| 49 | 2-chlorobutyl | 5 | Chlorinated paraffin wax-50% combined chlorine. | 5 | Polypropylene | Passed. |
| 50 | ....do | 10 | | | ....do | Failed. |
| 51 | | | Same as Ex. 49 | 10 | ....do | Do. |
| 52 | 2,4-dichlorobenzyl | 5 | Same as Ex. 49 | 5 | Polyethylene | Passed. |
| 53 | ....do | 10 | | | ....do | Failed. |
| 54 | | | Same as Ex. 49 | 10 | ....do | Do. |
| 55 | 2-chloroethyl | 5 | Same as Ex. 49 | 5 | Polystyrene | Passed. |
| 56 | ....do | 10 | | | ....do | Failed. |
| 57 | | | Same as Ex. 49 | 10 | ....do | Do. |
| 58 | Chloromethyl | 1.5 | Same as Ex. 49 | 1.5 | Polypropylene | Passed. |
| 59 | ....do | 3 | | | ....do | Failed. |

[1] Hexamethylenediamine-adipic acid reaction product.   [2] D-line at 20° C.

I claim:

1. A flame-retardant composition composed of a combination of (1) a chlorinated hydrocarbon containing from about 40–80% of combined chlorine and having a boiling point of at least 200° C. and (2) a phosphonic acid having the formula $$R-\overset{O}{\underset{\|}{P}}-(OH)_2$$

wherein R is selected from the group consisting of aryl ($C_6$–$C_{10}$), alkyl ($C_1$–$C_8$), aralkyl ($C_7$–$C_{11}$), and carboxy and halo substituted alkyl ($C_1$–$C_4$) radicals.

2. A flame-retardant composition according to claim 1 wherein (2) is o-chlorobenzylphosphonic acid.

3. A flame-retardant composition according to claim 1 wherein (2) is phenylphosphonic acid.

4. A flame-retardant composition according to claim 1 wherein (1) is a chlorinated paraffin wax.

5. A flame-retardant composition according to claim 1 wherein (1) is a polychlorinated cyclic hydrocarbon.

6. A flame-retarded composition composed of a thermoplastic polymer having incorporated therein a flame-retarding amount of the composition of claim 1.

7. A flame-retarded composition according to claim 6 wherein said thermoplastic polymer is a polyolefin.

8. A flame-retarded composition according to claim 6 wherein said thermoplastic polymer is polyethylene.

9. A flame-retarded composition according to claim 6 wherein said thermoplastic polymer is polypropylene.

10. A flame-retarded composition according to claim 6 wherein said thermoplastic polymer is polystyrene.

References Cited

UNITED STATES PATENTS 3,158,642  11/1964  Chapin et al. _____ 106—15

OTHER REFERENCES

"Fireproofing of Polymers with Derivatives of Phosphines and with Halogen-Phosphorus Compounds," Boyer et al. in SPE Transactions, January 1964, pages 45–55.

MORRIS LIEBMAN, *Primary Examiner.*

A. LIEBERMAN, *Assistant Examiner.*